United States Patent Office 2,776,961
Patented Jan. 8, 1957

2,776,961
PROCESS FOR THE MANUFACTURE OF AZO-DYESTUFFS

Alfred Hagenboecker and Max Blumer, Basel, Switzerland, assignors to Ciba Limited, Basel, Switzerland, a Swiss firm No Drawing. Application September 2, 1952,
Serial No. 307,566

Claims priority, application Switzerland October 4, 1951

3 Claims. (Cl. 260—196)

This invention relates to the manufacture of azo dyestuffs.

It is known that by coupling of various diazo components with 2-aminonaphthalene a number of very valuable dyestuffs having the radical

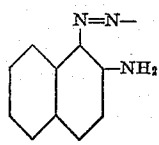

can be obtained. However, the handling of 2-aminonaphthtalene in its manufacture or use has often led to a serious danger to health. This may be caused, for example, by ordinary direct contact with the 2-aminonaphthalene or also by being present in rooms in which the air contains dust of 2-aminonaphthalene. The manufacture of the above specified dyestuffs from 2-aminonaphthalene is accordingly accompanied by serious disadvantages, because, especially in the manufacture, but also in the use of 2-aminonaphthalene, injury to health can only be avoided by observing very strict precautions.

According to the present process these dyestuffs can be produced without the use of 2-aminonaphthalene itself.

Apart from the consequent advantage of this factor, in some cases the dyestuffs are also of greater value from an optical point of view, since they possess or impart purer and brighter color shades than the dyestuffs of the same composition obtainable from 2-aminonaphthalene.

The production of these products according to the invention is based on the observation that 2-aminonaphthalene-1-sulfonic acid, in a surprising manner, may be coupled uniformly and smoothly with diazo compounds with splitting off of the sulfonic acid group in 1-position.

The process of the present invention therefore consists in that azo-dyestuffs are produced by coupling of diazo compounds with azo components, the azo component being 2-aminonaphthalene-1-sulfonic acid.

The diazo compounds also used as starting materials in this process may be selected as desired; there are concerned, for example, diazo-azo-compounds or diazo compounds free from azo groups of diazo compounds which are free from solubilizing groups or which contain solubilizing groups, especially sulfonic acid groups. It is particularly surprising that the coupling with the 2-aminonaphthalene-1-sulfonic acid takes place in very good yield and also with the production of very few disturbing secondary products, even in the case of diazo compounds which exhibit a low coupling capacity, for example with such as contain, in adjacent position to the diazotized amino group, a metal complex-forming group, for example a carboxylic acid group or especially a hydroxyl group.

The coupling according to the present invention can be carried out according to conventional methods, for example those applied when using aromatic amino compounds as azo components. The reaction is in general carried out in a medium which is acid, neutral or weakly alkaline, that is to say at pH values between 2 and 8, for example in a mineral acid medium or with the addition of sodium acetate as a buffer against mineral acid or in a medium which is alkaline with alkali bicarbonate. In some cases the presence of naphthalene-1-sulfonic acid is also of advantage.

According to the selection of the diazo compound, various dyestuffs, some of which are known, can be obtained according to the present process, for example pigments or water-soluble dyestuffs suitable for the dyeing of textiles, in the case of which further reactions can be carried out, as for example a treatment with agents providing metal or an oxidation to triazoles.

The following examples illustrate the invention, the parts and percentages being by weight unless otherwise stated and the relation between part by weight and part by volume being the same as that between the kilogram and the liter:

Example 1

14.15 parts of 1-amino-2-methyl-4-chlorobenzene are diazotized at 0–5° C. in 300 parts by volume of water and 30 parts of 30 percent hydrochloric acid, by the addition of 7 parts of sodium nitrite in 35 parts of water. The diazo solution produced is allowed to flow within one hour at 10° C. into a solution of 22.3 parts of 2-aminonaphthalene-1-sulfonic acid and 50 parts of crystalline sodium acetate in 700 parts of water. At the commencement of the introduction an orange-colored solution is produced but the separation of the dyestuff in well defined crystalline form soon commences. After 1–2 hours' further stirring the coupling is complete. The dyestuff is filtered off, washed and dried. The yield corresponds to the theoretical. In the colorless acetic acid filtrate, the sulfuric acid split off from the 2:1-naphthylamine sulfonic acid can be confirmed. The pigment dissolves in hydrocarbons and can be recrystallized therefrom. It melts at 138 to 139° C. (uncorrected) and is identical with the product obtainable from diazotized 1-amino-2-methyl-4-chlorobenzene and 2-aminonaphthalene.

The reaction can be carried out in the same manner when instead of 50 parts of crystalline sodium acetate 19 parts of anhydrous sodium carbonate are used.

Example 2

13.8 parts of 1-amino-4-nitrobenzene are diazotized at 0–5° C. in a known manner, in 300 parts of water and 30 parts of 30 percent hydrochloric acid with 7 parts of sodium nitrite. The diazo solution is allowed to flow within one hour at 10° C. into a solution in 700 parts of water of 22.3 parts of 2-aminonaphthalene-1-sulfonic acid and either 50 parts of crystalline sodium acetate or 19 parts of anhydrous sodium carbonate. The dyestuff separates as a bordeaux colored pigment and, when the coupling is complete, is filtered off, washed and dried. According to the selection of the buffer substance added, the colorless filtrate is either strongly acid with acetic acid or weakly alkaline when tested with brilliant yellow paper. The yield corresponds to the theoretical. The dyestuff, which is soluble in organic solvents, melts at 243–244° C. (uncorrected) and is identical with the product obtainable from diazotized 1-amino-4-nitrobenzene and 2-aminonaphthalene.

Example 3

23.4 parts of 2-amino-6-nitro-1-hydroxybenzene-4-sulfonic acid, in the form of the free acid, are dissolved in 100 parts of water and after addition of 1 part of 30 percent hydrochloric acid, are diazotized at 20° C. with 6.9 parts of sodium nitrite. The solution of the diazo compound is allowed to flow into a solution of 23.8 parts of 2-aminonaphthalene-1-sulfonic acid, 50 parts of water, 75 parts by volume of a solution which contains in 100 parts by volume 31 parts of naphthalene-1-sulfonic acid, and 46 parts of 30 percent sodium hydroxide solution and coupling is carried out for several hours at 50° C. The reaction is neutral to Congo red paper. The brown-violet dyestuff produced is filtered off and washed with a 1 percent sodium chloride solution. It is identical with the dyestuff obtained from diazotized 2-amino-6-nitro-1-hydroxybenzene-4-sulfonic acid and 2-aminonaphthalene.

*Example 4*

9 parts of 2-amino-5-nitro-1-hydroxybenzene are diazotized at 15° C. in 100 parts of water and 60 parts by volume of a solution which contains in 100 parts by volume 31 parts of naphthalene-1-sulfonic acid, and 4 parts of sodium nitrite. The suspension of the diazo compound is allowed to flow into a solution of 13.7 parts of 2-aminonaphthalene-1-sulfonic acid, 26 parts of crystalline sodium acetate and 100 parts of water and coupling carried out for several hours at 50° C. The black dyestuff produced is filtered off and washed with water. It is identical with the dyestuff obtained from diazotized 2-amino-5-nitro-1-hydroxybenzene and 2-aminonaphthalene.

*Example 5*

9 parts of 2-amino-5-nitro-1-hydroxybenzene are diazotized at 10° C. in 100 parts of water with 23 parts of 30 percent hydrochloric acid and 4 parts of sodium nitrite. The solution of the diazo compound is allowed to flow into a solution of 13.7 parts of 2-aminonaphthalene-1-sulfonic acid, 18 parts of crystalline sodium acetate and 100 parts of water and coupling is carried out for several hours at 50° C. The black dyestuff produced is filtered off and washed with water. It is identical with the dyestuff obtained from diazotized 2-amino-5-nitro-1-hydroxybenzene and 2-aminonaphthalene.

*Example 6*

21.7 parts of 2-aminobenzene-1-carboxylic acid-4-sulfonic acid, in the form of the free acid, are diazotized at 10° C. in 100 parts of water with 10 parts of 30 percent hydrochloric acid and 6.9 parts of sodium nitrite. The solution of the diazo compound is allowed to flow into a solution of 23.8 parts of 2-aminonaphthalene-1-sulfonic acid, 45 parts of crystalline sodium acetate and 170 parts of water and coupling is carried out for several hours at 15° C. The orange-red dyestuff produced is for the most part precipitated. The separation of the dyestuff can be completed with sodium chloride. The filtered and dried dyestuff dyes wool orange and is identical with the dyestuff obtained from diazotized 2-aminobenzene-1-carboxylic acid-4-sulfonic acid and 2-aminonaphthalene.

*Example 7*

48.65 parts of the zinc chloride double salt of the composition

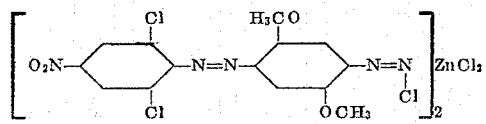

are dissolved in 2000 parts of cold water and the solution produced is added at room temperature to another solution from 22.3 parts of 2-aminonaphthalene-1-sulfonic acid, 60 parts of crystalline sodium acetate and 500 parts of water, the addition being made in such a manner that the mixture always contains a very slight excess of diazo compound. The coupling takes place rapidly and the blue disazo dyestuff separates out in very good yield. When recrystallized from toluene it has a melting point of 234–235° C. (uncorrected).

The zinc chloride double salt of the above formula may be produced in the following manner: 10 parts of 2:6-dichloro-4-nitro-1-aminobenzene are introduced at 40–50° C. into 27 parts of 95 percent sulfuric acid and the whole is thereupon stirred for one hour at 55–60° C. At 5–10° C., within about one hour, 15 parts of 42 percent nitrosyl sulfuric acid are now allowed to flow in and then stirring is continued for a further hour at the same temperature.

8 parts of 1-amino-2:5-dimethoxybenzene are dissolved in 85 parts of water at 90° C. with the addition of 6.5 parts of 78 percent sulfuric acid, the solution is filtered, if desired, for the removal of small amounts of impurities and by the addition of a further 94 parts of 78 percent sulfuric acid and the necessary quantity of water and ice the whole is made up to a volume of 760 parts by volume with a temperature of about −5° C.

The diazo solution is now allowed to flow in slowly at −4 to 0° C. and stirring continued for a further 4 hours, the temperature not being allowed to rise above 0° C. When the coupling is complete dilution is carried out with a further 150 to 200 parts of water, the temperature is allowed to rise to above 15° C. and the amino-monoazo-compound is diazotized by addition of a concentrated nitrite solution containing 5 parts of sodium nitrite. The time taken for the addition of the nitrite should be about 10 minutes and the temperature 15–16° C. Stirring is continued for a further hour, dilution effected by addition of water to a volume of 1800 parts by volume and the solution filtered at about 34° C., advantageously after the addition of some active charcoal and kieselguhr.

To this solution there is added at 30° C. a concentrated zinc chloride solution with a content of 4 parts of zinc chloride, and 300 parts of sodium chloride are then added. After cooling to 20° C., the zinc chloride double salt of the diazo-azo-compound is filtered off and, if desired, dried.

What we claim is:

1. Process for the manufacture of a monoazo dyestuff, which comprises coupling at a pH-value between 2 and 8 an ortho-hydroxy-diazo compound with 2-aminonaphthalene-1-sulfonic acid whereby, concomitantly with the formation of the dyestuff, the 1-sulfonic acid group of the 2-aminonaphthalene-1-sulfonic acid is split off.

2. Process for the manufacture of a monoazo dyestuff, which comprises coupling at a pH-value between 2 and 8 diazotized 2-amino-6-nitro-1-hydroxybenzene-4-sulfonic acid with 2-aminonaphthalene-1-sulfonic acid whereby, concomitantly with the formation of the dyestuff, the 1-sulfonic acid group of the 2-aminonaphthalene-1-sulfonic acid is split off.

3. Process for the manufacture of a monoazo dyestuff, which comprises coupling at a pH-value between 2 and 8 diazotized 2-amino-5-nitro-1-hydroxybenzene with 2-aminonaphthalene-1-sulfonic acid whereby, concomitantly with the formation of the dyestuff, the 1-sulfonic acid group of the 2-aminonaphthalene-1-sulfonic acid is split off.

References Cited in the file of this patent
UNITED STATES PATENTS 1,835,821    Straub et al.    Dec. 8, 1931
1,943,170    Felix    Jan. 9, 1934

OTHER REFERENCES

Fierz-David & Blangey, Fundamental Processes of Dye Chemistry (1949), pg. 251.
Richardson, Jour. Chem. Soc. (1951), pg. 911.
Badger, Structures and Reactions of Aromatic Compounds, 1954, pgs. 295–296.